US012243553B2

(12) United States Patent
Laitinen et al.

(10) Patent No.: US 12,243,553 B2
(45) Date of Patent: Mar. 4, 2025

(54) COMBINING OF SPATIAL AUDIO PARAMETERS

(71) Applicant: Nokia Technologies Oy, Espoo (FI)

(72) Inventors: Mikko-Ville Laitinen, Espoo (FI); Lasse Laaksonen, Tampere (FI); Anssi Rämö, Tampere (FI); Tapani Pihlajakuja, Kellokoski (FI); Adriana Vasilache, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 30 days.

(21) Appl. No.: 17/783,735

(22) PCT Filed: Nov. 13, 2020

(86) PCT No.: PCT/FI2020/050752
§ 371 (c)(1),
(2) Date: Jun. 9, 2022

(87) PCT Pub. No.: WO2021/130405
PCT Pub. Date: Jul. 1, 2021

(65) Prior Publication Data

US 2023/0402053 A1 Dec. 14, 2023

(30) Foreign Application Priority Data

Dec. 23, 2019 (GB) ..................................... 1919131

(51) Int. Cl.
*G10L 25/03* (2013.01)

(52) U.S. Cl.
CPC .................................... *G10L 25/03* (2013.01)

(58) Field of Classification Search
CPC ....... G10L 25/03; G10L 19/02; G10L 19/032; G10L 19/008; H04S 2420/03; H04S 2420/11; H04S 3/008
See application file for complete search history.

(56) References Cited

U.S. PATENT DOCUMENTS

2016/0217800 A1 7/2016 Purnhagen et al.

FOREIGN PATENT DOCUMENTS

| | | | | |
|---|---|---|---|---|
| GB | 2549532 A | | 10/2017 | |
| GB | 2574238 A | | 12/2019 | |
| WO | WO-2010017966 A1 | * | 2/2010 | ........... G10L 19/008 |
| WO | 2014/099285 A1 | | 6/2014 | |

(Continued)

OTHER PUBLICATIONS

Office action received for corresponding Indian Patent Application No. 202247041315, dated Nov. 2, 2022, 6 pages.

(Continued)

*Primary Examiner* — Daniel C Washburn
*Assistant Examiner* — Penny L Caudle
(74) *Attorney, Agent, or Firm* — ALSTON & BIRD LLP

(57) ABSTRACT

There is inter alia disclosed an apparatus for spatial audio encoding comprising: means for determining a first spatial audio parameter of a frequency sub band of one or more audio signals and a second spatial audio parameter of the frequency sub band of the one or more audio signals; and means for combining the first spatial audio parameter and the second spatial audio parameter to provide a combined spatial audio parameter for the frequency sub band.

16 Claims, 4 Drawing Sheets

(56) References Cited

FOREIGN PATENT DOCUMENTS

| | | | |
|---|---|---|---|
| WO | 2017/005978 | A1 | 1/2017 |
| WO | 2018/091776 | A1 | 5/2018 |
| WO | 2019/086757 | A1 | 5/2019 |
| WO | 2019/097018 | A1 | 5/2019 |
| WO | 2019/215391 | A1 | 11/2019 |
| WO | 2019/229298 | A1 | 12/2019 |
| WO | 2019/234290 | A1 | 12/2019 |
| WO | 2020/008105 | A1 | 1/2020 |
| WO | 2020/070377 | A1 | 4/2020 |
| WO | 2020/089510 | A1 | 5/2020 |
| WO | 2020/193865 | A1 | 10/2020 |
| WO | 2021/048468 | A1 | 3/2021 |
| WO | 2021/130404 | A1 | 7/2021 |

OTHER PUBLICATIONS

Extended European Search Report received for corresponding European Patent Application No. 20908067.0, dated Dec. 20, 2023, 9 pages.

"Proposal for MASA common metadata and metadata structure", 3GPP TSG-SA4#101 meeting, S4-181353, Agenda: 7.5, Nokia Corporation, Nov. 19-23, 2018, pp. 1-4.

Politis et al., "Sector-Based Parametric Sound Field Reproduction in the Spherical Harmonic Domain", IEEE Journal of Selected Topics in Signal Processing, vol. 9, No. 5, Aug. 2015, pp. 852-866.

Search Report received for corresponding United Kingdom Patent Application No. 1919131.1, dated May 6, 2020, 4 pages.

International Search Report and Written Opinion received for corresponding Patent Cooperation Treaty Application No. PCT/FI2020/050752, dated May 19, 2021, 17 pages.

Li et al., "The Perceptual Lossless Quantization of Spatial Parameter for 3D Audio Signals", International Conference on Multimedia Modeling, 2017, pp. 381-392.

"Description of the IVAS MASA C Reference Software", 3GPP TSG-SA4#106 meeting, S4-191167, Agenda: 7.5, Nokia Corporation, Oct. 21-25, 2019, pp. 1-16.

Gao et al., "Azimuthal Perceptual Resolution Model Based Adaptive 3D Spatial Parameter Coding", International Conference on Multimedia Modeling, 2015, pp. 534-545.

Pulkki, "Virtual Sound Source Positioning Using Vector Base Amplitude Panning", Journal of the audio engineering society, vol. 45 No. 6, Jun. 1997, pp. 456-466.

* cited by examiner

COMBINING OF SPATIAL AUDIO PARAMETERS

RELATED APPLICATION

This application was originally filed as PCT Application No. PCT/FI2020/050752, filed on Nov. 13, 2020, which claims priority from GB Application No. 1919131.1, filed on Dec. 23, 2019, each of which is incorporated herein by reference in its entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as surround coherence, spread coherence, number of directions, distance etc) for an audio codec. For example, these parameters can be estimated from microphone-array captured audio signals, and for example a stereo or mono signal can be generated from the microphone array signals to be conveyed with the spatial metadata. The stereo signal could be encoded, for example, with an AAC encoder and the mono signal could be encoded with an EVS encoder. A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field. Furthermore, the analysis of higher-order Ambisonics (HOA) input for multi-direction spatial metadata extraction has also been documented in the scientific literature related to higher-order directional audio coding (HO-DirAC).

A further input for the encoder is also multi-channel loudspeaker input, such as 5.1 or 7.1 channel surround inputs and audio objects.

However, with respect to the components of the spatial metadata the compression and encoding of the spatial audio parameters is of considerable interest in order to minimise the overall number of bits required to represent the spatial audio parameters.

SUMMARY

There is provided according to a first aspect an apparatus for spatial audio encoding comprising means for determining a first spatial audio parameter of a frequency sub band of one or more audio signals and a second spatial audio parameter of the frequency sub band of the one or more audio signals; and means for combining the first spatial audio parameter and the second spatial audio parameter to provide a combined spatial audio parameter for the frequency sub band.

The apparatus may further comprise means for determining whether the combined spatial audio parameter for the frequency sub band is encoded for storage and/or transmission or whether the first spatial audio parameter for the frequency sub band and the second spatial audio parameter for the frequency sub band is encoded for storage and/or transmission.

The apparatus may further comprise: means for determining a metric for the frequency sub band of the one of more audio signals; means for comparing the metric against a threshold value, wherein the apparatus further comprising the means for determining whether the combined spatial audio parameter for the frequency sub band is encoded for storage and/or transmission or whether the first spatial audio parameter for the frequency sub band and the second spatial audio parameter for the frequency sub band is encoded for storage and/or transmission may comprise: means for determining that when the metric is above the threshold value then determining that the first spatial audio parameter for the frequency sub band and the second spatial audio parameter for the frequency sub band is encoded for storage and/or transmission; and means for determining that when the metric is below or equal to the threshold value then determining that the combined spatial audio parameter for the frequency sub band is encoded for storage and/or transmission.

The apparatus may further comprise: means for determining a metric for the frequency sub band of the one or more audio signals; means for determining a first spatial audio parameter of at least one further frequency sub band of the one or more audio signals and a second spatial audio parameter of the at least one further frequency sub band of the one or more audio signals; means for combining the first spatial audio parameter of the at least one further frequency sub band of the one or more audio signals and the second spatial audio parameter of the at least one further frequency sub band of the one or more audio signals to provide a combined spatial audio parameter for the further frequency sub band of the one or more audio signals; means for determining a further metric for the at least one further frequency sub band; and means for determining that the first spatial audio parameter of the frequency sub band of the one or more audio signals and the second spatial audio parameter of the frequency sub band of the one or more audio signals are encoded for storage and/or transmission and the combined spatial audio parameter for the at least one further frequency sub band of the one or more audio signals is encoded for storage and/or transmission when the metric is higher than the further metric.

The first spatial audio parameter may be a first spherical direction vector calculated for the frequency sub band comprising an azimuth component and an elevation component, wherein the second spatial audio parameter may be a second spherical direction vector calculated for the frequency sub band comprising an azimuth component and an elevation component, and wherein the combined spatial audio parameter may be a combined spherical direction vector.

The means for combining the first spatial audio parameter and the second spatial audio parameter may comprise: means for converting the first spherical direction vector into a first cartesian vector and means for converting the second spherical direction vector into a second cartesian vector, wherein the first cartesian vector and second cartesian vector each comprise an x-axis component, y-axis component and a z-axis component, wherein for each single respective component the apparatus may comprise: means for weighting the respective component of the first cartesian vector by a first direct to total energy ratio calculated for the frequency sub band; means for weighting the respective component of the second cartesian vector by a second direct to total energy ratio calculated for the frequency sub band; and means for summing the weighted respective component of the first cartesian vector and the weighted respective components of the second cartesian vector to give a combined respective cartesian components, wherein the combined x-axis cartesian component, the combined y-axis cartesian component and the combined z-axis cartesian component form the components of a combined cartesian vector; and means for converting the combined x-axis cartesian component, the combined y-axis cartesian component and the combined z-axis cartesian component into the combined spherical direction vector.

The apparatus may further comprise means for determining an ambient energy value for the frequency sub band by subtracting the first direct to total energy ratio calculated for the frequency sub band and second direct to total energy calculated for the frequency sub band from one.

The apparatus may further comprise means for combining the first direct to total energy ratio calculated for the frequency sub band and the second direct to total energy ratio calculated for the frequency sub band to provide a combined direct to total energy ratio for the frequency sub band.

The means for combining the first direct to total energy ratio calculated for the frequency sub band and the second direct to total energy ratio calculated for the frequency sub band to provide a combined direct to total energy ratio for the frequency sub band may comprise:means for determining a combined direct to total energy ratio dependent on the ratio of a vector length of the combined cartesian vector to a sum of the first direct to total energy ratio calculated for the frequency sub band the second direct to total energy ratio calculated for the frequency sub band and the ambient energy value.

The apparatus may further comprise means for combining a first spread coherence value calculated for the frequency sub band and a second spread coherence value calculated for the frequency sub band, to provide a combined spread coherence parameter for the frequency sub band.

The means for combining the first spread coherence value calculated for the frequency sub band and the second spread coherence value calculated for the frequency sub band to provide a combined spread coherence parameter for the frequency sub band may comprise: means for determining a first sum comprising a product of the first spread coherence value calculated for the frequency sub band and the first direct to total energy ratio calculated for the frequency sub band and a product of the second spread coherence value calculated for the frequency sub band and the second direct to total energy ratio calculated for the frequency sub band; means for determining a second sum comprising the first direct to total energy ratio calculated for the frequency sub band and the second direct to total energy ratio calculated for the frequency sub band; and means for determining the ratio of the first sum to the second sum to provide the combined spread coherence parameter.

The apparatus for spatial audio encoding may further comprises means for calculating a surround coherence value for the frequency sub band; means for determining a further ambient energy value for the frequency sub band by subtracting the combined direct-to-total energy ratio from one; means for determining a surround coherence energy by determining the product of the combined spread coherence parameter with the difference between the further ambient energy value for the frequency sub band and ambient energy value for the frequency sub band; and means for adding the surround coherence energy to the product of the ambient energy for the frequency sub band and the surround coherence value for the frequency sub band and normalising to the further ambient energy value for the frequency sub band to provide a combined surround coherence value.

The apparatus comprising the means for determining a metric may comprise: means for determining the difference between sum of the first direct to total energy ratio calculated for the frequency sub band and the second direct to total energy ratio calculated for the frequency sub band and the length of the combined cartesian vector.

The first spatial audio parameter may be associated with a first sound source direction in the frequency sub band, and the second spatial audio parameter may be associated with a second sound source direction in the frequency sub band.

There is according to a second aspect a method for spatial audio encoding comprising: determining a first spatial audio parameter of a frequency sub band of one or more audio signals and a second spatial audio parameter of the frequency sub band of the one or more audio signals; and combining the first spatial audio parameter and the second spatial audio parameter to provide a combined spatial audio parameter for the frequency sub band.

The method may further comprise determining whether the combined spatial audio parameter for the frequency sub band is encoded for storage and/or transmission or whether the first spatial audio parameter for the frequency sub band and the second spatial audio parameter for the frequency sub band is encoded for storage and/or transmission.

The method may further comprise: determining a metric for the frequency sub band of the one of more audio signals; comparing the metric against a threshold value, wherein the apparatus further comprising the means for determining whether the combined spatial audio parameter for the frequency sub band is encoded for storage and/or transmission or whether the first spatial audio parameter for the frequency sub band and the second spatial audio parameter for the frequency sub band is encoded for storage and/or transmission may comprise: determining that when the metric is above the threshold value then determining that the first spatial audio parameter for the frequency sub band and the second spatial audio parameter for the frequency sub band is encoded for storage and/or transmission; and determining that when the metric is below or equal to the threshold value then determining that the combined spatial audio parameter for the frequency sub band is encoded for storage and/or transmission.

The method may further comprise: determining a metric for the frequency sub band of the one or more audio signals; determining a first spatial audio parameter of at least one further frequency sub band of the one or more audio signals and a second spatial audio parameter of the at least one further frequency sub band of the one or more audio signals; combining the first spatial audio parameter of the at least one further frequency sub band of the one or more audio signals and the second spatial audio parameter of the at least one further frequency sub band of the one or more audio signals to provide a combined spatial audio parameter for the further frequency sub band of the one or more audio signals; determining a further metric for the at least one further frequency sub band; and determining that the first spatial audio parameter of the frequency sub band of the one or more audio signals and the second spatial audio parameter of the frequency sub band of the one or more audio signals are encoded for storage and/or transmission and the combined spatial audio parameter for the at least one further frequency sub band of the one or more audio signals is encoded for storage and/or transmission when the metric is higher than the further metric.

The first spatial audio parameter may be a first spherical direction vector calculated for the frequency sub band comprising an azimuth component and an elevation component, wherein the second spatial audio parameter may be a second spherical direction vector calculated for the frequency sub band comprising an azimuth component and an elevation component, and wherein the combined spatial audio parameter may be a combined spherical direction vector.

The combining the first spatial audio parameter and the second spatial audio parameter may comprise: converting the first spherical direction vector into a first cartesian vector and means for converting the second spherical direction vector into a second cartesian vector, wherein the first cartesian vector and second cartesian vector each comprise an x-axis component, y-axis component and a z-axis component, wherein for each single respective component the method may comprise: weighting the respective component of the first cartesian vector by a first direct to total energy ratio calculated for the frequency sub band; weighting the respective component of the second cartesian vector by a second direct to total energy ratio calculated for the frequency sub band; and summing the weighted respective component of the first cartesian vector and the weighted respective components of the second cartesian vector to give a combined respective cartesian components, wherein the combined x-axis cartesian component, the combined y-axis cartesian component and the combined z-axis cartesian component form the components of a combined cartesian vector; and converting the combined x-axis cartesian component, the combined y-axis cartesian component and the combined z-axis cartesian component into the combined spherical direction vector.

The method may further comprise determining an ambient energy value for the frequency sub band by subtracting the first direct to total energy ratio calculated for the frequency sub band and second direct to total energy calculated for the frequency sub band from one.

The method may further comprise combining the first direct to total energy ratio calculated for the frequency sub band and the second direct to total energy ratio calculated for the frequency sub band to provide a combined direct to total energy ratio for the frequency sub band.

The combining the first direct to total energy ratio calculated for the frequency sub band and the second direct to total energy ratio calculated for the frequency sub band to provide a combined direct to total energy ratio for the frequency sub band may comprise:determining a combined direct to total energy ratio dependent on the ratio of a vector length of the combined cartesian vector to a sum of the first direct to total energy ratio calculated for the frequency sub band the second direct to total energy ratio calculated for the frequency sub band and the ambient energy value.

The method may further comprise combining a first spread coherence value calculated for the frequency sub band and a second spread coherence value calculated for the frequency sub band, to provide a combined spread coherence parameter for the frequency sub band.

Combining the first spread coherence value calculated for the frequency sub band and the second spread coherence value calculated for the frequency sub band to provide a combined spread coherence parameter for the frequency sub band may comprise: determining a first sum comprising a product of the first spread coherence value calculated for the frequency sub band and the first direct to total energy ratio calculated for the frequency sub band and a product of the second spread coherence value calculated for the frequency sub band and the second direct to total energy ratio calculated for the frequency sub band; determining a second sum comprising the first direct to total energy ratio calculated for the frequency sub band and the second direct to total energy ratio calculated for the frequency sub band; and determining the ratio of the first sum to the second sum to provide the combined spread coherence parameter.

The method for spatial audio encoding may further comprise: calculating a surround coherence value for the frequency sub band; determining a further ambient energy value for the frequency sub band by subtracting the combined direct-to-total energy ratio from one; determining a surround coherence energy by determining the product of the combined spread coherence parameter with the difference between the further ambient energy value for the frequency sub band and ambient energy value for the frequency sub band; and adding the surround coherence energy to the product of the ambient energy for the frequency sub band and the surround coherence value for the frequency sub band and normalising to the further ambient energy value for the frequency sub band to provide a combined surround coherence value.

Comprising the determining a metric may comprise: determining the difference between sum of the first direct to total energy ratio calculated for the frequency sub band and the second direct to total energy ratio calculated for the frequency sub band and the length of the combined cartesian vector.

The first spatial audio parameter may be associated with a first sound source direction in the frequency sub band, and the second spatial audio parameter may be associated with a second sound source direction in the frequency sub band.

According to a third aspect there is an apparatus for spatial audio encoding comprising at least one processor and at least one memory including computer program code, the at least one memory and the computer program code configured to, with the at least one processor, cause the apparatus to at least to determine a first spatial audio parameter of a frequency sub band of one or more audio signals and a second spatial audio parameter of the frequency sub band of the one or more audio signals; combine the first spatial audio parameter and the second spatial audio parameter to provide a combined spatial audio parameter for the frequency sub band.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
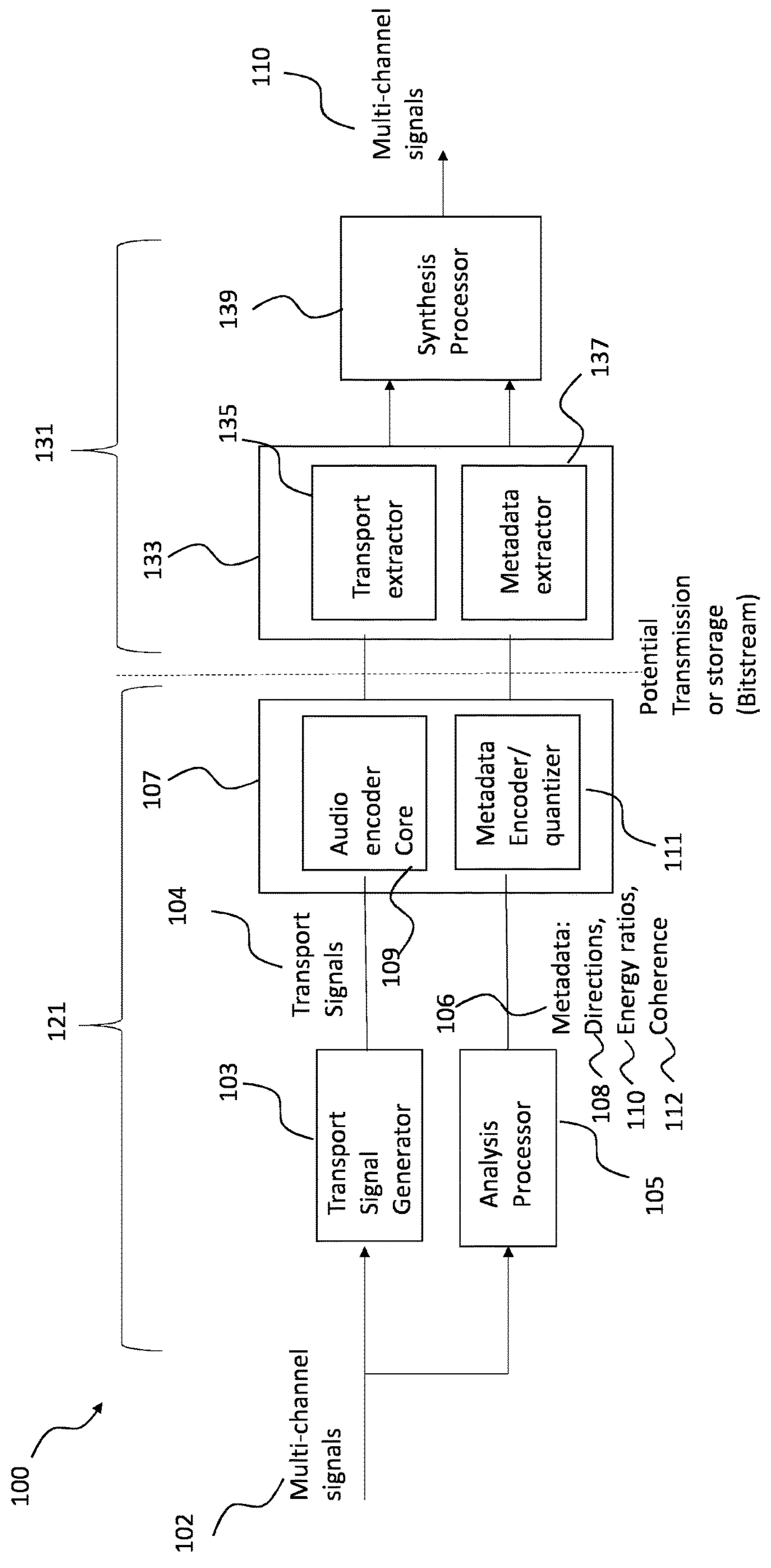
FIG. 1 shows schematically a system of apparatus suitable for implementing some embodiments.

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction. Furthermore, the output of the example system is a multi-channel loudspeaker arrangement. However, it is understood that the output may be rendered to the user via means other than loudspeakers. Furthermore, the multi-channel loudspeaker signals may be generalised to be two or more playback audio signals. Such a system is currently being standardised by the 3GPP standardization body as the Immersive Voice and Audio Service (IVAS). IVAS is intended to be an extension to the existing 3GPP Enhanced Voice Service (EVS) codec in order to facilitate immersive voice and audio services over existing and future mobile (cellular) and fixed line networks. An application of IVAS may be the provision of immersive voice and audio services over 3GPP fourth generation (4G) and fifth generation (5G) networks. In addition, the IVAS codec as an extension to EVS may be used in store and forward applications in which the audio and speech content is encoded and stored in a file for playback. It is to be appreciated that IVAS may be used in conjunction with other audio and speech coding technologies which have the functionality of coding the samples of audio and speech signals.

The metadata consists at least of spherical directions (elevation, azimuth), at least one energy ratio of a resulting direction, a spread coherence, and surround coherence independent of the direction, for each considered time-frequency (TF) block or tile, in other words a time/frequency sub band. In total IVAS may have a number of different types of metadata parameters for each time-frequency (TF) tile. The types of spatial audio parameters which make up the metadata for IVAS are shown in Table 1 below.

| Field | Bits | Description |
|---|---|---|
| Direction index | 16 | Direction of arrival of the sound at a time-frequency parameter interval. Spherical representation at about 1-degree accuracy.<br>Range of values: "covers all directions at about 1° accuracy" |
| Direct-to-total energy ratio | 8 | Energy ratio for the direction index (i.e., time-frequency subframe).<br>Calculated as energy in direction/total energy.<br>Range of values: [0.0, 1.0] |
| Spread coherence | 8 | Spread of energy for the direction index (i.e., time-frequency subframe).<br>Defines the direction to be reproduced as a point source or coherently around the direction.<br>Range of values: [0.0, 1.0] |
| Diffuse-to-total energy ratio | 8 | Energy ratio of non-directional sound over surrounding directions.<br>Calculated as energy of non-directional sound/total energy.<br>Range of values: [0.0, 1.0]<br>(Parameter is independent of number of directions provided.) |
| Surround coherence | 8 | Coherence of the non-directional sound over the surrounding directions.<br>Range of values: [0.0, 1.0]<br>(Parameter is independent of number of directions provided.) |
| Remainder-to-total energy ratio | 8 | Energy ratio of the remainder (such as microphone noise) sound energy to fulfil requirement that sum of energy ratios is 1.<br>Calculated as energy of remainder sound/total energy.<br>Range of values: [0.0, 1.0]<br>(Parameter is independent of number of directions provided.) |
| Distance | 8 | Distance of the sound originating from the direction index (i.e., time-frequency subframes) in meters on a logarithmic scale.<br>Range of values: for example, 0 to 100 m.<br>(Feature intended mainly for future extensions, e.g., 6DoF audio.) |

This data may be encoded and transmitted (or stored) by the encoder in order to be able to reconstruct the spatial signal at the decoder.

Moreover, in some instances metadata assisted spatial audio (MASA) may support up to two directions for each TF tile which would require the above parameters to be encoded and transmitted for each direction on a per TF tile basis. Thereby potentially doubling the required bit rate according to Table 1. In addition, it is easy to foresee that other MASA systems may support more than two directions per TF tile.

The bitrate allocated for metadata in a practical immersive audio communications codec may vary greatly. Typical overall operating bitrates of the codec may leave only 2 to 10 kbps for the transmission/storage of spatial metadata. However, some further implementations may allow up to 30 kbps or higher for the transmission/storage of spatial metadata. The encoding of the direction parameters and energy ratio components has been examined before along with the encoding of the coherence data. However, whatever the transmission/storage bit rate assigned for spatial metadata there will always be a need to use as few bits as possible to represent these parameters especially when a TF tile may support multiple directions corresponding to different sound sources in the spatial audio scene.

The concept as discussed hereafter is to combine each spatial audio parameters associated with each direction into one or more combined spatial audio parameter on a per TF tile basis.

Accordingly, the invention proceeds from the consideration that the bit rate on a per TF tile basis may be reduced by combining the spatial audio parameters associated with each direction.

In this regard FIG. 1 depicts an example apparatus and system for implementing embodiments of the application. The system 100 is shown with an 'analysis' part 121 and a 'synthesis' part 131. The 'analysis' part 121 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example, in some embodiments the spatial analyser and the spatial analysis may be implemented external to the encoder. For example, in some embodiments the spatial metadata associated with the audio signals may be provided to an encoder as a separate bit-stream. In some embodiments the spatial metadata may be provided as a set of spatial (direction) index values. These are examples of a metadata-based audio input format.

The multi-channel signals are passed to a transport signal generator 103 and to an analysis processor 105.

In some embodiments the transport signal generator 103 is configured to receive the multi-channel signals and generate a suitable transport signal comprising a determined number of channels and output the transport signals 104. For example, the transport signal generator 103 may be configured to generate a 2-audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, a direction parameter 108 and an energy ratio parameter 110 and a coherence parameter 112 (and in some embodiments a diffuseness parameter). The direction, energy ratio and coherence parameters may in some embodiments be considered to be spatial audio parameters. In other words, the spatial audio parameters comprise parameters which aim to characterize the sound-field created/captured by the multi-channel signals (or two or more audio signals in general).

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The transport signals 104 and the metadata 106 may be passed to an encoder 107.

The encoder 107 may comprise an audio encoder core 109 which is configured to receive the transport (for example downmix) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a transport extractor 135 which is configured to decode the audio signals to obtain the transport signals. Similarly, the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the metadata.

Therefore, in summary first the system (analysis part) is configured to receive multi-channel audio signals.

Then the system (analysis part) is configured to generate a suitable transport audio signal (for example by selecting or downmixing some of the audio signal channels) and the spatial audio parameters as metadata.

The system is then configured to encode for storage/transmission the transport signal and the metadata.

After this the system may store/transmit the encoded transport and metadata.

The system may retrieve/receive the encoded transport and metadata.

Then the system is configured to extract the transport and metadata from encoded transport and metadata parameters, for example demultiplex and decode the encoded transport and metadata parameters.

The system (synthesis part) is configured to synthesize an output multi-channel audio signal based on extracted transport audio signals and metadata.

Figure 2:
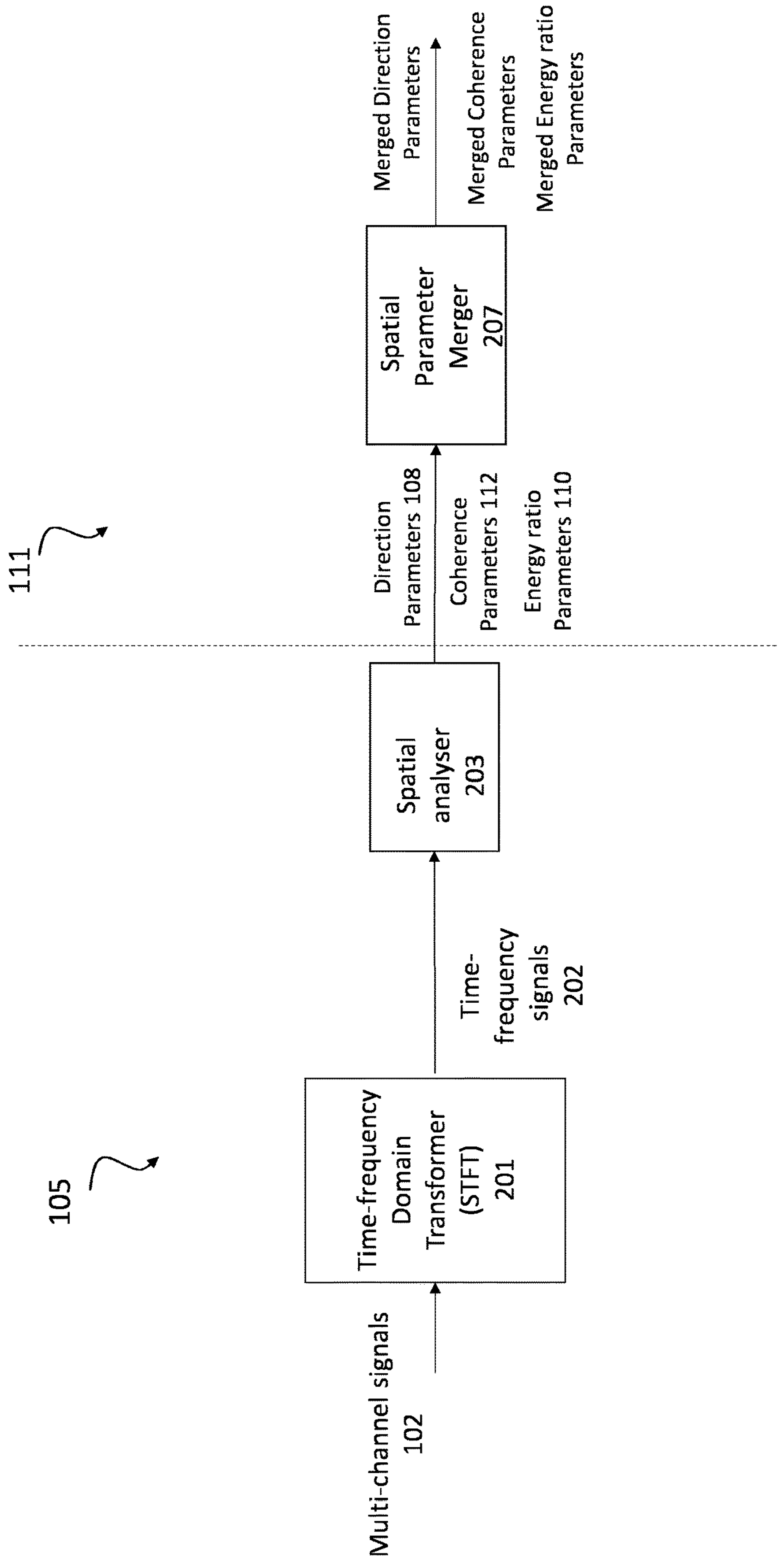
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

FIGS. 1 and 2 depict the Metadata encoder/quantizer 111 and the analysis processor 105 as being coupled together. However, it is to be appreciated that some embodiments may not so tightly couple these two respective processing entities such that the analysis processor 105 can exist on a different device from the Metadata encoder/quantizer 111. Consequently, a device comprising the Metadata encoder/quantizer 111 may be presented with the transport signals and metadata streams for processing and encoding independently from the process of capturing and analysing. In this case the energy estimator 205 may be configured to be part of the Metadata encoder/quantizer 111.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus for example, the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into sub bands that group one or more of the bins into a sub band of a band index k=0, . . . , K−1. Each sub band k has a lowest bin $b_{k,low}$ and a highest bin $b_{k,high}$, and the subband contains all bins from $b_{k,low}$ to $b_{k,high}$ The widths of the sub bands can approximate any suitable distribution. For example, the Equivalent rectangular bandwidth (ERB) scale or the Bark scale.

A time frequency (TF) tile (or block) is thus a specific sub band within a subframe of the frame.

It can be appreciated that the number of bits required to represent the spatial audio parameters may be dependent at least in part on the TF (time-frequency) tile resolution (i.e., the number of TF subframes or tiles). For example, a 20 ms audio frame may be divided into 4 time-domain subframes of 5 ms a piece, and each time-domain subframe may have up to 24 frequency subbands divided in the frequency domain according to a Bark scale, an approximation of it, or any other suitable division. In this particular example the audio frame may be divided into 96 TF subframes/tiles, in other words 4 time-domain subframes with 24 frequency subbands. Therefore, the number of bits required to represent the spatial audio parameters for an audio frame can be dependent on the TF tile resolution. For example, if each TF tile were to be encoded according to the distribution of Table 1 above then each TF tile would require 64 bits per sound source direction. For two sound source directions per TF tile there would be a need of 2×64 bits for the complete encoding of both directions. It is to be noted the that the use of the term sound source can signify dominant directions of the propagating sound in the TF tile.

Embodiments aim to reduce the number of bits when there is more than one sound source direction per TF tile.

In embodiments the analysis processor 105 may comprise a spatial analyser 203.

The spatial analyser 203 may be configured to receive the time-frequency signals 202 and based on these signals estimate direction parameters 108. The direction parameters may be determined based on any audio based 'direction' determination.

For example, in some embodiments the spatial analyser 203 is configured to estimate the direction of a sound source with two or more signal inputs.

The spatial analyser 203 may thus be configured to provide at least one azimuth and elevation for each frequency band and temporal time-frequency block within a frame of an audio signal, denoted as azimuth ϕ)(k, n), and elevation θ(k, n). The direction parameters 108 for the time sub frame may be also be passed to the spatial parameter merger 207.

The spatial analyser 203 may also be configured to determine an energy ratio parameter 110. The energy ratio may be considered to be a determination of the energy of the audio signal which can be considered to arrive from a direction. The direct-to-total energy ratio r(k, n) can be estimated, e.g., using a stability measure of the directional estimate, or using any correlation measure, or any other suitable method to obtain a ratio parameter. Each direct-to-total energy ratio corresponds to a specific spatial direction and describes how much of the energy comes from the specific spatial direction compared to the total energy. This value may also be represented for each time-frequency tile separately. The spatial direction parameters and direct-to-total energy ratio describe how much of the total energy for each time-frequency tile is coming from the specific direction. In general, a spatial direction parameter can also be thought of as the direction of arrival (DOA).

In embodiments the direct-to-total energy ratio parameter can be estimated based on the normalized cross-correlation parameter cor'(k, n) between a microphone pair at band k, the value of the cross-correlation parameter lies between −1 and 1. The direct-to-total energy ratio parameter r(k, n) can be determined by comparing the normalized cross-correlation parameter to a diffuse field normalized cross correlation parameter $cor'_D(k, n)$ as $$r(k, n) = \frac{cor'(k, n) - cor'_D(k, n)}{1 - cor'_D(k, n)}.$$

The direct-to-total energy ratio is explained further in PCT publication WO2017/005978 which is incorporated herein by reference. The energy ratio may be passed to the spatial parameter merger 207.

In embodiments the parameters relating to a second direction (for the TF tile) may be analysed using higher-order directional audio coding with HOA input or the method as presented in the PCT publication WO2019/215391 with mobile device input. Details of Higher-order directional audio coding may be found in the IEEE Journal of Selected Topics in Signal Processing "Sector-Based Parametric Sound Field Reproduction in the Spherical Harmonic Domain," Volume 9 Issue 5.

The spatial analyser 203 may furthermore be configured to determine a number of coherence parameters 112 which may include surrounding coherence (γ(k, n)) and spread coherence (ζ(k, n)), both analysed in time-frequency domain.

Each of the aforementioned coherence parameters are next discussed. All the processing is performed in the time-frequency domain, so the time-frequency indices k and n are dropped where necessary for brevity.

Let us first consider the situation where the sound is reproduced coherently using two spaced loudspeakers (e.g., front left and right) instead of a single loudspeaker. The coherence analyser may be configured to detect that such a method has been applied in surround mixing.

It is to be understood that the following sections explain the analysis of the spread and surround coherences in terms of a multichannel loudspeaker signal input. However, similar practices can be applied when the input comprises the microphone array as input.

In some embodiments therefore the spatial analyser 203 may be configured to calculate, the covariance matrix C for the given analysis interval consisting of one or more time indices n and frequency bins b. The size of the matrix is $N_L \times N_L$, and the entries are denoted as $c_{ij}$, where $N_L$ is the number of loudspeaker channels, and i and j are loudspeaker channel indices.

Next, the spatial analyser 203 may be configured to determine the loudspeaker channel $i_c$ closest to the estimated direction (which in this example is azimuth θ).

$$i_c = \arg(\min(|\theta - \alpha_i|))$$

where $\alpha_i$ is the angle of the loudspeaker i.

Furthermore, in such embodiments the spatial analyser 203 is configured to determine the loudspeakers closest on the left $i_l$ and the right $i_r$ side of the loudspeaker $i_c$.

A normalized coherence between loudspeakers i and j is denoted as $$c'_{ij} = \frac{|c_{ij}|}{\sqrt{|c_{ii}c_{jj}|}},$$

using this equation, the spatial analyser 203 may be configured to calculate a normalized coherence $c'_{lr}$ between $i_l$ and $i_r$. In other words, calculate $$c'_{lr} = \frac{|c_{lr}|}{\sqrt{|c_{ll}c_{rr}|}}.$$

Furthermore, the spatial analyser 203 may be configured to determine the energy of the loudspeaker channels i using the diagonal entries of the covariance matrix $$E_i = c_{ii},$$

and determine a ratio between the energies of the $i_l$ and $i_r$ loudspeakers and $i_l$, $i_r$, and $i_c$ loudspeakers as $$\xi_{lr/lrc} = \frac{E_l + E_r}{E_l + E_r + E_c}.$$

The spatial analyser 203 may then use these determined variables to generate a 'stereoness' parameter $$\mu = c'_{lr}\xi_{lr/lrc}$$

This 'stereoness' parameter has a value between 0 and 1. A value of 1 means that there is coherent sound in loudspeakers $i_l$ and $i_r$ and this sound dominates the energy of this sector. The reason for this could, for example, be the loudspeaker mix used amplitude panning techniques for creating an "airy" perception of the sound. A value of 0 means that no such techniques has been applied, and, for example, the sound may simply be positioned to the closest loudspeaker.

Furthermore, the spatial analyser 203 may be configured to detect, or at least identify, the situation where the sound is reproduced coherently using three (or more) loudspeakers for creating a "close" perception (e.g., use front left, right and centre instead of only centre). This may be because a soundmixing engineer produces such a situation in surround mixing the multichannel loudspeaker mix.

In such embodiments the same loudspeakers $i_l$, $i_r$, and $i_c$ identified earlier are used by the coherence analyser to determine normalized coherence values $c'_{cl}$ and $c'_{cr}$ using the normalized coherence determination discussed earlier. In other words the following values are computed:

$$c'_{cl} = \frac{|c_{cl}|}{\sqrt{|c_{cc}c_{ll}|}},\ c'_{cr} = \frac{|c_{cr}|}{\sqrt{|c_{cc}c_{rr}|}}.$$

The spatial analyser 203 may then determine a normalized coherence value $c'_{clr}$ depicting the coherence among these loudspeakers using the following:

$$c'_{clr} = \min(c'_{cl}, c'_{cr}).$$

In addition, the spatial analyser 203 may be configured to determine a parameter that depicts how evenly the energy is distributed between the channels $i_l$, $i_r$, and $i_c$, $$\xi_{clr} = \min\left(\frac{E_l}{E_c}, \frac{E_c}{E_l}, \frac{E_r}{E_c}, \frac{E_c}{E_r}\right).$$

Using these variables, the spatial analyser 203 may determine a new coherent panning parameter κ as, $$\kappa = c'_{clr}\xi_{clr}.$$

This coherent panning parameter κ has values between 0 and 1. A value of 1 means that there is coherent sound in all loudspeakers $i_l$, $i_r$, and $i_c$, and the energy of this sound is evenly distributed among these loudspeakers. The reason for this could, for example, be because the loudspeaker mix was generated using studio mixing techniques for creating a perception of a sound source being closer. A value of 0 means that no such technique has been applied, and, for example, the sound may simply be positioned to the closest loudspeaker.

The spatial analyser 203 determined "stereoness" parameter μ which measures the amount of coherent sound in $i_l$ and $i_r$ (but not in $i_c$), and coherent panning parameter κ which measures the amount of coherent sound in all $i_l$, $i_r$, and $i_c$ is configured to use these to determine coherence parameters to be output as metadata.

Thus, the spatial analyser 203 is configured to combine the "stereoness" parameter μ and coherent panning parameter κ to form a spread coherence ζ parameter, which has values from 0 to 1. A spread coherence ζ value of 0 denotes a point source, in other words, the sound should be reproduced with as few loudspeakers as possible (e.g., using only the loudspeaker $i_c$). As the value of the spread coherence ζ increases, more energy is spread to the loudspeakers around the loudspeaker $i_c$; until at the value 0.5, the energy is evenly spread among the loudspeakers $i_l$, $i_r$, and $i_c$. As the value of spread coherence ζ increases over 0.5, the energy in the loudspeaker $i_c$ is decreased; until at the value 1, there is no energy in the loudspeaker $i_c$, and all the energy is at loudspeakers $i_l$ and $i_r$.

Using the aforementioned parameters μ and κ, the spatial analyser 203 is configured in some embodiments to determine a spread coherence parameter ζ, using the following expression:

$$\zeta = \begin{cases} \max(0.5, \mu - \kappa + 0.5), & \text{if } \max(\mu, \kappa) > 0.5 \ \& \ \kappa > \mu \\ \max(\mu, \kappa), & \text{else} \end{cases}.$$

The above expression is an example only and it should be noted that the spatial analyser 203 may estimate the spread coherence parameter ζ in any other way as long as it complies with the above definition of the parameter.

As well as being configured to detect the earlier situations the spatial analyser 203 may be configured to detect, or at least identify, the situation where the sound is reproduced coherently from all (or nearly all) loudspeakers for creating an "inside-the-head" or "above" perception.

In some embodiments spatial analyser 203 may be configured to sort, the energies $E_i$, and the loudspeaker channel $i_e$ with the largest value determined.

The spatial analyser 203 may then be configured to determine the normalized coherence $c'_{ij}$ between this channel and $M_L$ other loudest channels. These normalized coherence $c'_{ij}$ values between this channel and $M_L$ other loudest channels may then be monitored. In some embodiments $M_L$ may be $N_L-1$, which would mean monitoring the coherence between the loudest and all the other loudspeaker channels. However, in some embodiments $M_L$ may be a smaller number, e.g., $N_L-2$. Using these normalized coherence values, the coherence analyser may be configured to determine a surrounding coherence parameter γ using the following expression:

$$\gamma = \min_{M}(c'_{i_e j}),$$

where $c'_{i_e j}$ are the normalized coherences between the loudest channel and $M_L$ next loudest channels.

The surrounding coherence parameter γ has values from 0 to 1. A value of 1 means that there is coherence between all (or nearly all) loudspeaker channels. A value of 0 means that there is no coherence between all (or even nearly all) loudspeaker channels.

The above expression is only one example of an estimate for a surrounding coherence parameter γ, and any other way can be used, as long as it complies with the above definition of the parameter.

The spatial analyser 203 may be configured to output the determined coherence parameters spread coherence parameter ζ and surrounding coherence parameter γ to the spatial parameter merger 207.

Therefore, for each sub band k there will be collection of spatial audio parameters associated with the sub band. In this instance each sub band k may have the following spatial parameters associated with it; at least one azimuth and elevation denoted as azimuth ϕ(k, n), and elevation θ(k, n), surrounding coherence (γ(k, n)) and spread coherence (ζ(k, n)) and a direct-to-total energy ratio parameter r(k, n).

In embodiments the spatial parameter combiner 207 can be arranged to combine a number of each of the aforementioned parameters for each sound source direction into combined parameters for fewer number of directions. For instance, a typical example may exist where a TF tile may have been assigned two sets of spatial audio parameters, one set for each direction. The spatial parameter combiner in this instance may be configured to combine the two sets of spatial audio parameters into one combined set of spatial audio parameters on a per TF tile basis.

Generally, therefore the spatial parameter combiner 207 can be arranged to combine N sets of spatial parameters (one set per direction) on a per TF tile basis into Q sets of combined spatial parameters, where Q<N. For, example in the case of three directions per TF tile, the corresponding spatial parameter sets may be combined into a single set of combined spatial audio parameters. Another example may comprise four directions on a per TF tile basis. In this instance the sets of spatial audio parameters associated with each direction (four in total) maybe combined into two sets of combined spatial parameters.

For the sake of clarity, the following explanation is laid out from the consideration of having two sound source directions per TF tile. However, it is to be appreciated that the combining may take place over spatial audio parameter sets associated with a higher number of sound source directions.

Figure 3:
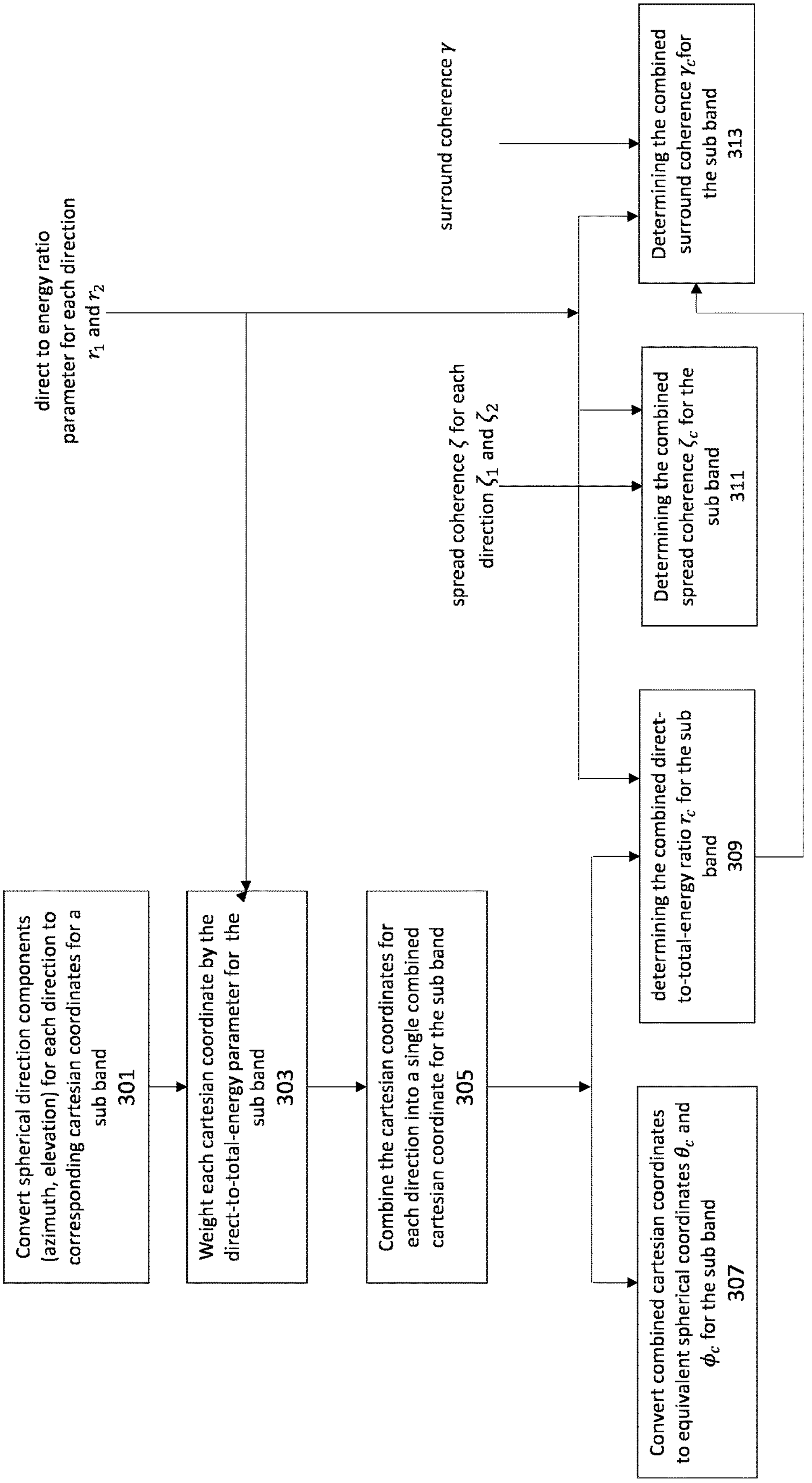
FIG. 3 shows a flow diagram of the operation of the metadata encoder as shown in FIG. 2 according to some embodiments.

In this respect FIG. 3 depicts some of the processing steps the spatial parameter combiner 207 may be arranged to perform in some embodiments.

It is to be appreciated that the subsequent processing steps are performed on a per TF tile basis. In other words, the processing is performed for each sub band k in a sub frame n.

The spatial parameter combiner 207 may perform the combining by initially taking the azimuth $\phi_1$(k, n) and elevation $\theta_1$(k, n) spherical direction component for a first direction and the azimuth $\phi_2$(k, n) and elevation $\theta_2$(k, n) spherical direction components for a second direction and converting each direction component to their respective cartesian coordinate.

Each cartesian coordinate may then be weighted by the respective direct-to-total energy ratio parameter r(k, n) for the respective direction.

The conversion operation for an azimuth $\phi_1$(k, n) and elevation direction $\theta_1$(k, n) component of the first direction gives the first direction X axis direction component as $$x_1(k,n)=r_1(k,n)\cos\theta_1(k,n)\cos\phi_1(k,n)$$

the Y axis component as $$y_1(k,n)=r_1(k,n)\cos\theta_1(k,n)\sin\phi_1(k,n)$$

and the Z axis component as $$z_1(k,n)=r_1(k,n)\sin\theta_1(k,n)$$

The same step can be performed for the second direction to give the second direction X axis direction component as $$x_2(k,n)=r_2(k,n)\cos\theta_2(k,n)\cos\phi_2(k,n)$$

the second direction Y axis component as $$y_2(k,n)=r_2(k,n)\cos\theta_2(k,n)\sin\phi_2(k,n)$$

and the second direction Z axis component as $$z_2(k,n)=r_2(k,n)\sin\theta_2(k,n)$$

The step of converting the spherical direction components for each direction to their equivalent cartesian coordinate x, y, z is shown as the processing step 301 in FIG. 3

The step of weighting each cartesian coordinate x, y, z by their respective direct-to-total energy parameter is shown as the processing step 303 in FIG. 3.

The spatial parameter combiner 207 may then be arranged to combine each respective cartesian coordinates for each direction in turn to give a combined cartesian. This combining step for each cartesian coordinate may be expressed as $$x_c(k,n)=x_1(k,n)+x_2(k,n)$$

$$y_c(k,n)=y_1(k,n)+y_2(k,n)$$

$$z_c(k,n)=z_1(k,n)+z_2(k,n)$$

The step of combining the cartesian coordinates for each direction is shown in FIG. 3 as processing step 305.

Once the cartesian coordinates x, y, z for all directions have been combined into the cartesian coordinates $x_c$, $y_c$ and $z_c$, the combined cartesian coordinates can be converted to their equivalent merged azimuth $\phi_c(k, n)$ and elevation spherical $\theta_c(k, n)$ direction components. In embodiments this conversion may be performed for each of the combined cartesian coordinates $x_c$, $y_c$ and $z_c$ by using the following expressions;

$$\phi_c(k, n) = a\tan\frac{y_c(k, n)}{x_c(k, n)} \quad (4)$$

$$\theta_c(k, n) = a\tan\frac{z_c(k, n)}{\sqrt{x_c(k, n)^2 + y_c(k, n)^2}} \quad (5)$$

where function atan is the arc tangent that automatically detects the correct quadrant for the angle.

The step of converting the merged cartesian coordinates to their equivalent merged spherical coordinates for each merged frequency band is shown as processing step 307 in FIG. 3.

In embodiments the combined cartesian coordinates calculated as part of step 305 can be used in conjunction with the direct-to-total energy ratios for each direction to determine a combined direct-to-total energy ratio for the two directions. The combined direct-to-total energy ratio $r_c(k, n)$ can be determined from the following expression $$r_c(k, n) = \frac{\sqrt{x_c(k, n)^2 + y_c(k, n)^2 + x_c(k, n)^2}}{r_1(k, n) + r_2(k, n) + ca_{12}(k, n)}$$

It can be seen that the numerator is the length of the combined cartesian coordinate vector, which is normalised according to the sum of the first and second direction direct-to-total energy ratios $(r_1(k, n)+r_2(k, n))$ and an additional factor $ca_{12}(k, n)$.

The term $a_{12}(k, n)$ is a value for the ambient energy, i.e. the energy remaining in the TF tile after the energy according to the two directions have been removed. In embodiments the ambient energy may be expressed as $$a_{12}(k,n)=1-(r_1(k,n)+r_2(k,n))$$

The factor c is tuneable factor whose value can lie between 0 and 1 (e.g. c=0.5) which controls the balance between direct and ambient streams.

The step of determining the combined direct-to-total energy ratio $r_c$ is shown as processing step 309.

Additionally, some embodiments may derive a combined spread coherence $\zeta_c(k, n)$ for the two directions $\zeta_1(k, n)$, $\zeta_2(k, n)$ which can be calculated as the ratio-weighted average of the spread coherences of each direction by using the direct-to-total energy ratios for the two directions $(r_1(k, n), r_2(k, n))$.

This can be expressed in embodiments as $$\zeta_c(k, n) = \frac{\zeta_1(k, n)r_1(k, n) + \zeta_2(k, n)r_2(k, n)}{r_1(k, n) + r_2(k, n)}$$

The step of determining the combined spread coherence value $\zeta_c$ for the first and second directions is shown as processing step 311.

The spatial parameter combiner 307 may also compute a value for a combined surround coherence $\gamma_c(k, n)$ for the first and second directions in a TF tile.

In embodiments for a TF tile with two directions, there may be a single surround coherence value $\gamma_{12}(k, n)$ which as stated before is a measure of how coherent the non-directional sound is. In this case, the amount of non-directional sound can be obtained as $a_{12}(k, n)=1-(r_1(k, n)+r_2(k, n))$, which is the amount of energy after the contribution of the two directional components have been removed according to the respective direct-to-total energy ratios.

The combined surround coherence $\gamma_c(k, n)$ may be derived from the premise on quantifying whether an increase in non-directional sound is coherent or incoherent. In embodiments the combined surround coherence $\gamma_c(k, n)$ may be written as $$\gamma_c(k, n) = \frac{a_{12}(k, n)\gamma_{12}(k, n) + (a(k, n) - a_{12}(k, n))\zeta_c(k, n)}{a(k, n)}$$

Where $a(k, n)=1-r_c(k, n)$ is the energy of non-directional sound i.e. the ambient sound of the combined first direction and second direction. The increase in the captured sound field of surround coherence energy may be computed as $a(k, n)-a_{12}(k, n))\zeta_c(k, n)$, and the energy in the captured sound field of non-directional coherent sound may be given as $a_{12}(k, n)\gamma_{12}(k, n)$. In this example for a derivation of a combined surround coherence, it was assumed that the increase of non-directional energy would be coherent if the spread coherences of the original directions were large, and that the increase of non-directional energy would be incoherent if the spread coherences of the original directions were small.

The step of determining the combined surround coherence value $\gamma_c$ for the first and second directions is shown as processing step 313.

In embodiments the spatial parameter combiner 207 may have an additional functional element which provides as estimate (or measure) of the importance (in effect an importance estimator) of having the full number of spatial parameter sets (or directions) per TF tile compared to a reduced number of combined spatial parameter sets (and therefore a reduced number of directions). This estimate may then be fed to a decision functional element within the spatial parameter combiner 207 which decides whether the output for a TF tile may have the spatial parameters for each direction or whether the output for the TF tile may comprise sets of combined spatial audio parameters. Furthermore, in embodiments which have three or more directions, the decision functional element may make a decision whether to combine the spatial parameters associated with some of the directions and leaving the spatial parameters of other directions as un-combined.

Following on from the example above in which there are two directions per TF tile the role of the importance estimator can be to estimate the importance to perceived audio quality of having the sets of spatial audio parameters for both directions rather than having a single set of combined spatial audio parameters.

To this end the importance measure may be estimated (or derived) by comparing the sum of the direct-to-total energy for each direction to the length of the combined cartesian coordinate vector as derived above.

Therefore, the importance estimate (or measure) λ(k, n) may be expressed for a TF tile as $$\lambda(k,n)=(r_1(k,n)+r_2(k,n))-\sqrt{x_c(k,n)^2+y_c(k,n)^2+x_c(k,n)^2}$$

In this case the selection as to whether to transmit the both sets of (original) spatial parameter sets for both directions or the combined spatial parameter set for one direction can be based on a comparison as to whether the importance measure λ(k, n) exceeds a threshold value $\lambda_{th}$.

Such that if $\lambda(k, n)>\lambda_{th}$ the decision may be made to encode and transmit the original spatial audio parameters for both directions as metadata.

if $\lambda(k, n)\leq\lambda_{th}$ the decision may be made to encode and transmit the combined spatial audio parameters as metadata.

In the case of a decision to transmit both directions, in other words the two sets of original spatial audio parameters as metadata for the TF tile, the spatial parameter combiner 207 may be configured to output the original (un-combined) sets of spatial audio parameters for the first and second directions $\theta_1(k, n)$, $\theta_2(k, n)$, $\phi_1(k, n)$, $\phi_2(k, n)$, $r_1(k, n)$, $r_2(k, n)$, $\zeta_1(k, n)$, $\zeta_2(k, n)$, and $\gamma_{12}(k, n)$.

In the case of a decision to transmit 1-direction, in other words the combined set of spatial audio parameters for the TF tile, the spatial parameter combiner 207 will be configured to output the combined spatial audio parameter set $\theta_c(k, n)$, $\phi_c(k, n)$, $r_c(k, n)$, $\zeta_c(k, n)$ and $\gamma_c(k, n)$.

It is to be appreciated that in the above cases it would be required to signal whether to transmit 2-direction or 1-direction on a per TF tile basis.

It is to be appreciated that in the above circumstances a signalling bit may need to be included in the metadata in order to indicate whether the spatial audio parameters are for one direction (i.e. combined spatial audio parameter set) or for two directions (i.e. the original/un-combined spatial audio parameter sets).

In other embodiments the selection as performed by the spatial parameter combiner 207 may be performed at a higher level of granularity than that for every TF tile. For instance, may be advantageous to signal for a group of TF tiles. This may be achieved by taking the mean of the importance measure over a group of N sub frames such that the importance measure may be given by $$\lambda_{avg}(k, m) = \frac{\sum_{n=1}^{N} \lambda(k, n)}{N}$$

Where N is the number of sub frames in a frame m. Using an average value for the importance measure has the advantage of only requiring a signalling bit for a group of merged frames and/or frequency band rather than a signalling bit for every merged time frame and/or frequency band.

The importance measure may have the characteristic such that if the two directions point approximately in the same direction the importance measure λ(k, n) will tend to have a lower value (in other words tend to zero). This may be accounted for by $(r_1(k, n)+r_2(k, n))$ being similar in value to $\sqrt{x_c(k,n)^2+y_c(k,n)^2+x_c(k,n)^2}$. The importance measure λ(k, n) will also tend to have a low value if one of the direct-to-total energy ratios is significantly larger than the other. In contrast however, if the two directions tend to point in opposite directions and that the direct-to-total energy ratios associated with each of the directions is approximately the same then the importance measure λ(k, n) will tend to have a value of 1.

In embodiments the value chosen as the threshold $\lambda_{th}$ can be fixed, and experimentation has found a value of 0.3 was found to give an advantageous result.

In other embodiments the importance threshold $\lambda_{th}$ may be determined for a frame by sorting the N importance measures λ(k, n) in a frame in an ascending order and determining the threshold as the value of the importance measure which gives a specific number of importance measures in the frame above the threshold, for example the threshold measure may be adjusted so that there is an I number of subframes in the frame whose importance measure is above the adjusted threshold.

In this case the I number of subframes would use 2 directions per TF tile, and N−I subframes (those subframes below the importance threshold) would use 1 combined direction per TF tile.

Additionally, some embodiments may not deploy a threshold value. In these embodiments a number of the most important TF tiles in the frame/sub frame may be arranged to use un-combined directions, and the remaining number of TF tiles in the frame/sub frame are arranged to use combined directions.

Furthermore, additional embodiments may determine whether a particular TF tile should be arranged to be encoded with combined or un-combined directions on an average basis. This may comprise having an average number of TF tiles arranged to encode with combined directions and an average number of TF tiles arranged to encode with un-combined directions.

In further embodiments the importance threshold $\lambda_{th}$ may be adaptive to a running median value of importance measures over the last N temporal sub frames (for example the last 20 sub frames). Such that $\lambda_{med}(n)$ may denotes the median value for the subframe n of the importance measures over the last N subframes over all frequency bands. The importance threshold $\lambda_{th}(n)$ for the subframe n may then be expressed as $\lambda_{th}(n)=c_{th}\lambda_{med}(n)$ where $c_{th}$ is a coefficient controlling the value of the importance threshold, for example $c_{th}$ may be assigned the value 0.5.

The metadata encoder/quantizer 111 may comprise a direction encoder. The direction encoder can be configured to receive the combined direction parameters (such as the azimuth $\phi_c$ and elevation $\theta_c$,)(and in some embodiments an expected bit allocation) and from this generate a suitable encoded output. In some embodiments the encoding is based on an arrangement of spheres forming a spherical grid arranged in rings on a 'surface' sphere which are defined by a look up table defined by the determined quantization resolution. In other words, the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable quantization, linear or non-linear may be used.

The metadata encoder/quantizer 111 may comprise an energy ratio encoder. The energy ratio encoder 207 may be configured to receive the combined energy ratio $r_c$ for each TF tile and determine a suitable encoding for compressing the energy ratios.

Similarly, the metadata encoder/quantizer 111 may also comprise a coherence encoder which may be configured to receive the combined surround coherence values $\gamma_c$ and spread coherence values $\zeta_c$ and determine a suitable encoding for compressing the surround and spread coherence values for the TF tile The encoded combined direction, energy ratios and coherence values may be passed to the combiner 211. The combiner is configured to receive the encoded (or quantized/compressed) merged directional parameters, energy ratio parameters and coherence parameters and combine these to generate a suitable output (for example a metadata bit stream which may be combined with the transport signal or be separately transmitted or stored from the transport signal).

It is to be noted in the embodiments which deploy the above importance estimator the metadata encoder/quantizer 111 may either receive the combined spatial audio parameters on a per TF tile basis as described above, or the un-combined original sets of spatial audio parameters for each direction on a per TF tile basis. In the latter case, the un-combined spatial parameter sets for each direction are passed to the various encoders rather than the combined spatial parameter sets. In this instance the metadata for each tile may be accompanied with a signalling bit indicating whether the spatial parameter data is combined/or un-combined.

Embodiments may deploy a method of entropy encoding the bits indicating whether a TF tile is encoded with one or more directions. This may be useful in cases where there are fixed number of sub bands in a frame which are assigned to have multiple directions.

In some embodiments the encoded datastream may be passed to the decoder/multiplexer 133. The decoder/demultiplexer 133 demultiplexes/extracts the encoded combined direction indices, combined energy ratio indices and combined coherence indices for each TF tile and passes them to the metadata extractor 137 and also the decoder/demultiplexer 133 may in some embodiments extract and pass the transport audio signals to the transport extractor 135 for decoding and extracting.

In embodiments the decoder/demultiplexer 133 may be arranged to receive and decode the signalling bit indicating whether the accompanying received encoded spatial audio parameters are combined or un-combined for a specific TF tile.

The encoded combined energy ratio indices, direction indices and coherence indices may be decoded by their respective decoders to generate the combined energy ratios, directions and coherences for the TF tile. This can be performed by applying the inverse of the various encoding processes employed at the encoder.

In the case of the signalling bit indicating that the spatial audio parameters are not combined, the sets of received spatial audio parameters (for each direction of the TF tile) may be passed directly to the various decoders for decoding.

The decoded spatial audio parameters may then form the decoded metadata output from the metadata extractor 137 and passed to the synthesis processor 139 in order to form the multi-channel signals 110.

Figure 4:
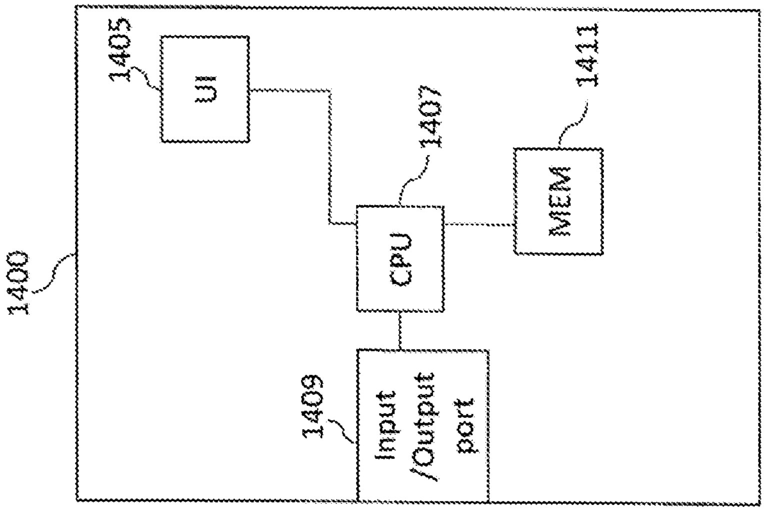
FIG. 4 shows schematically an example device suitable for implementing the apparatus shown.

With respect to FIG. 4 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus of an audio encoder comprising at least one processor and at least one memory including computer program code, the at least one memory and the computer program code configured to, with the at least one processor, cause the apparatus to:

determine or receive a first spherical direction vector comprising an azimuth component and an elevation component for a time frequency tile of the one or more audio signals and a second spherical direction vector comprising an azimuth component and an elevation component for the time frequency tile of the one or more audio signals;

combine the first spherical direction vector and the second spherical direction vector to provide a combined spherical direction vector for the time frequency tile by the apparatus being caused, to:

convert the first spherical direction vector into a first cartesian vector and convert the second spherical direction vector into a second cartesian vector, wherein the first cartesian vector and second cartesian vector each comprise an x-axis component, a y-axis component and a z-axis component, wherein for each respective component the apparatus is caused to;

weight the respective component of the first cartesian vector by a first direct to total energy ratio calculated for the time frequency tile;

weight the respective component of the second cartesian vector by a second direct to total energy ratio calculated for the time frequency tile;

sum the weighted respective component of the first cartesian vector and the weighted respective component of the second cartesian vector to give a combined respective cartesian component, wherein the combined x-axis cartesian component, the combined y-axis cartesian component and the combined z-axis cartesian component form the components of a combined cartesian vector; and convert the combined x-axis cartesian component, the combined y-axis cartesian component and the combined z-axis cartesian component into the combined spherical direction vector; and encode at least one of the first spherical direction vector, the second spherical direction vector or the combined spherical direction vector for at least one of storage or transmission.

2. The apparatus as claimed in claim 1, wherein the apparatus is further caused to:

determine whether the combined spherical direction vector for the time frequency tile is encoded for at least one of storage or transmission;

or determine whether the first spherical direction vector for the time frequency tile and the second spherical direction vector for the time frequency tile is encoded for at least one of storage or transmission.

3. The apparatus as claimed in claim 2, wherein the apparatus is further caused to:

determine a metric for the time frequency tile of the one of more audio signals;

compare the metric against a threshold value, wherein when the metric is above the threshold value, the apparatus is caused to determine that the first spherical direction vector for the time frequency tile and the second spherical direction vector for the time frequency tile is encoded for at least one of storage or transmission; and wherein when the metric is below or equal to the threshold value, the apparatus is further caused to determine that the combined spherical direction vector for the time frequency tile is encoded for at least one of storage or transmission.

4. The apparatus as claimed in claim 1, wherein the apparatus is further caused to:

determine a metric for the time frequency tile of the one or more audio signals;

determine a first spherical direction vector for at least one further time frequency tile of the one or more audio signals and a second spherical direction vector for the at least one further time frequency tile of the one or more audio signals;

combine the first spherical direction vector for the at least one further time frequency tile of the one or more audio signals and the second spherical direction vector for the at least one further time frequency tile of the one or more audio signals to provide a combined spherical direction vector for the further time frequency tile of the one or more audio signals;

determine a further metric for the at least one further time frequency tile; and determine that the first spherical direction vector for the time frequency tile of the one or more audio signals and the second spherical direction vector for the time frequency tile of the one or more audio signals are encoded for at least one of storage or transmission and the combined spherical direction vector for the at least one further time frequency tile of the one or more audio signals is encoded for at least one of storage or transmission when the metric is higher than the further metric.

5. The apparatus as claimed in claim 1, wherein the apparatus is further caused to determine an ambient energy value for the time frequency tile by subtracting the first direct to total energy ratio calculated for the time frequency tile and the second direct to total energy ratio calculated for the time frequency tile from one.

6. The apparatus as claimed in claim 1, wherein the apparatus is further caused to combine the first direct to total energy ratio calculated for the time frequency tile and the second direct to total energy ratio calculated for the time frequency tile to provide a combined direct to total energy ratio for the time frequency tile.

7. The apparatus as claimed in claim 6, wherein to combine the first direct to total energy ratio calculated for the time frequency tile and the second direct to total energy ratio calculated for the time frequency tile to provide a combined direct to total energy ratio for the time frequency tile the apparatus is caused to:

determine the combined direct to total energy ratio dependent on the ratio of a vector length of a combined cartesian vector to a sum of the first direct to total energy ratio calculated for the time frequency tile, the second direct to total energy ratio calculated for the time frequency tile and the ambient energy value.

8. The apparatus as claimed in claim 1, wherein the apparatus is further caused to combine a first spread coherence value calculated for the time frequency tile and a second spread coherence value calculated for the time frequency tile, to provide a combined spread coherence parameter for the time frequency tile.

9. The apparatus as claimed in claim 8, wherein the apparatus is further caused to combine a first spread coherence value calculated for the time frequency tile and a second spread coherence value calculated for the time frequency tile, to provide a combined spread coherence parameter for the time frequency tile, and wherein to provide the combined spread coherence parameter for the time frequency tile, the apparatus is further caused to:

determine a first sum comprising a product of the first spread coherence value calculated for the time frequency tile and the first direct to total energy ratio calculate for the time frequency tile and a product of the second spread coherence value calculated for the time frequency tile and the second direct to total energy ratio calculated for the time frequency tile;

determine a second sum comprising the first direct to total energy ratio calculated for the time frequency tile and the second direct to total energy ratio calculated for the time frequency tile; and determine the ratio of the first sum to the second sum to provide the combined spread coherence parameter.

10. The apparatus as claimed in claim 8, wherein the apparatus is further caused to:

calculate a surround coherence value for the time frequency tile;

determine a further ambient energy value for the time frequency tile by subtracting the combined direct to total energy ratio from one;

determine a surround coherence energy by determining the product of the combined spread coherence parameter with the difference between the further ambient energy value for the time frequency tile and ambient energy value for the time frequency tile; and add the surround coherence energy to the product of the ambient energy for the time frequency tile and the surround coherence value for the time frequency tile and normalize to the further ambient energy value for the time frequency tile to provide a combined surround coherence value.

11. The apparatus as claimed in claim 1, wherein the apparatus is further caused to determine a metric, and wherein to determine the metric, the apparatus is caused to:

determine a difference between a sum of a first direct to total energy ratio calculated for the time frequency tile and a second direct to total energy ratio calculated for the time frequency tile and a length of the combined cartesian vector.

12. The apparatus as claimed in claim 1, wherein the first spherical direction vector is associated with a first sound source direction in the time frequency tile, and the second spherical direction vector is associated with a second sound source direction in the time frequency tile.

13. A method for audio encoding, the method comprising:

determining or receiving a first spherical direction vector comprising an azimuth component and an elevation component for a time frequency tile of one or more audio signals and a second spherical direction vector comprising an azimuth component and an elevation component for the time frequency tile band of the one or more audio signals;

combining the first spherical direction vector and the second spherical direction vector to provide a combined spherical direction vector for the time frequency tile by the apparatus being caused to:

convert the first spherical direction vector into a first cartesian vector and convert the second spherical direction vector into a second cartesian vector, wherein the first cartesian vector and second cartesian vector each comprise an x-axis component, a y-axis component and a z-axis component, wherein for each respective component the apparatus is caused to:

weight the respective component of the first cartesian vector by a first direct to total energy ratio calculated for the time frequency tile;

weight the respective component of the second cartesian vector by a second direct to total energy ratio calculated for the time frequency tile;

sum the weighted respective component of the first cartesian vector and the weighted respective component of the second cartesian vector to give a combined respective cartesian component, wherein the combined x-axis cartesian component, the combined y-axis cartesian component and the combined z-axis cartesian component form the components of a combined cartesian vector; and convert the combined x-axis cartesian component, the combined y-axis cartesian component and the combined z-axis cartesian component into the combined spherical direction vector; and encoding at least one of the first spherical direction vector, the second spherical direction vector or the combined spherical direction vector for at least one of storage or transmission.

14. The method as claimed in claim 13, wherein the method further comprises determining whether the combined spherical direction vector for the time frequency tile is encoded for at least one of storage or transmission; or determining whether the first spherical direction vector for the time frequency tile and the second spherical direction vector for the time frequency tile is encoded for at least one of storage or transmission.

15. The method as claimed in claim 14, wherein the method further comprises:

determining a metric for the time frequency tile of the one of more audio signals;

comparing the metric against a threshold value, wherein when the metric is above the threshold value the method determines that the first spherical direction vector for the time frequency tile and the second spherical direction vector for the time frequency tile is encoded for at least one of storage or transmission; and wherein when the metric is below or equal to the threshold value the method determines that the combined spherical direction vector for the time frequency tile is encoded for at least one of storage or transmission.

16. The method as claimed in claim 14, wherein the method further comprises:

determining a metric for the time frequency tile of the one or more audio signals;

determining a first spherical direction vector of at least one further time frequency tile of the one or more audio signals and a second spherical direction vector of the at least one further time frequency tile of the one or more audio signals;

combining the first spherical direction vector of the at least one further time frequency tile of the one or more audio signals and the second spherical direction vector of the at least one further time frequency tile of the one or more audio signals to provide a combined spherical direction vector for the further time frequency tile of the one or more audio signals;

determining a further metric for the at least one further time frequency tile; and determining that the first spherical direction vector of the time frequency tile of the one or more audio signals and the second spherical direction vector of the time frequency tile of the one or more audio signals are encoded for at least one of storage or transmission and the combined spherical direction vector for the at least one further time frequency tile of the one or more audio signals is encoded for at least one of storage or transmission when the metric is higher than the further metric.

* * * * *